United States Patent
Tsuda et al.

(10) Patent No.: US 6,816,319 B2
(45) Date of Patent: Nov. 9, 2004

(54) PLANAR LENS

(75) Inventors: Masahiro Tsuda, Osaka (JP);
Shigekazu Yoshii, Osaka (JP); Koichi Sakaguchi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/370,532

(22) Filed: Feb. 24, 2003

(65) Prior Publication Data

US 2003/0161048 A1 Aug. 28, 2003

(30) Foreign Application Priority Data

| Feb. 22, 2002 | (JP) | ........................................ | 2002-046194 |
| May 16, 2002 | (JP) | ........................................ | 2002-141475 |
| Oct. 17, 2002 | (JP) | ........................................ | 2002-303199 |

(51) Int. Cl.[7] ................................................. G02B 3/00
(52) U.S. Cl. ........................ 359/652; 359/653; 359/654
(58) Field of Search ................................. 359/652–654

(56) References Cited

U.S. PATENT DOCUMENTS

| 3,729,253 A | * | 4/1973 | Moore et al. ................ 359/653 |
| 4,509,824 A | * | 4/1985 | Yamasaki et al. ............ 359/619 |
| 4,518,222 A | * | 5/1985 | Borrelli et al. .............. 359/620 |
| 4,844,589 A | * | 7/1989 | Asahara et al. .............. 359/652 |
| 5,104,435 A | * | 4/1992 | Oikawa et al. ............. 65/30.13 |
| 6,476,975 B1 | * | 11/2002 | Yoshii et al. ................ 359/652 |

FOREIGN PATENT DOCUMENTS

| JP | 61-26535 A | 2/1986 |
| JP | 61-132541 A | 6/1986 |
| JP | 61-201639 A | 9/1986 |

* cited by examiner

*Primary Examiner*—Evelyn A. Lester
(74) *Attorney, Agent, or Firm*—Sughrue Mion, PLLC

(57) ABSTRACT

The planar lens of the invention having a flat glass substrate, in which a refractive index distribution is formed by diffusing a refractive index-increasing component into the flat glass substrate in a substantially hemispherical form or semicylinder form, wherein the refractive index-increasing component is silver, and the flat glass substrate comprises Li as an alkali metal that is subject to an ion exchange with the silver.

12 Claims, 10 Drawing Sheets

FIG. 3A
FIG. 3B
FIG. 3C
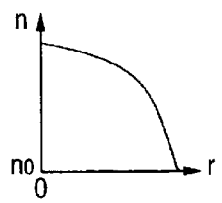
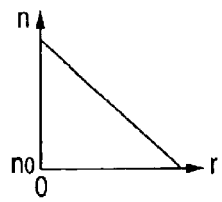
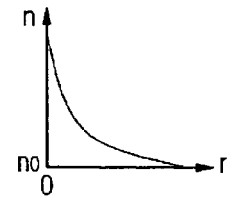
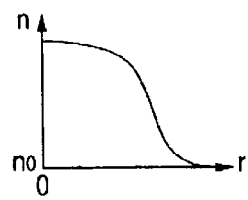
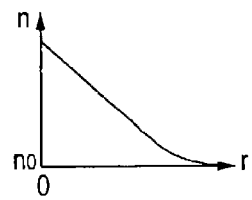
CONCAVE SHAPE
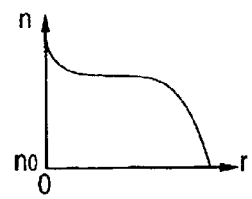
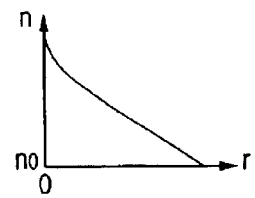
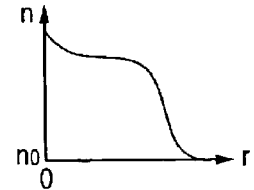
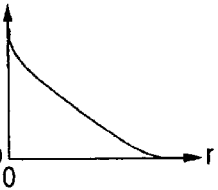
CONVEX SHAPE
LINEAR SHAPE

PLANAR LENS

FIELD OF THE INVENTION

The present invention relates to a planar lens for use in the art of optical communication, optical data processing, etc., and a production method thereof.

DESCRIPTION OF THE RELATED ART

To cope with the rise in capacity of communications or the rise in the amount of data to be processed in data processing, the utilization of parallelism of light has been noted as an extremely effective means. In order to utilize parallelism of light, it is desired that optical fibers, which are optical transmission means, be arranged in arrays, not to mention light source and optical detector. It is necessary that lenses, which are light coupling means, be arrayed as well.

A planar lens array having many fine lens formed in a transparent flat substrate has excellent characteristics of arrayed lens. Since such a planar lens array is prepared by photolithography, a fine lens having a diameter of not greater than 1 mm can be easily prepared. Further, these lenses can be arrayed with a high precision. Accordingly, these lenses can be easily aligned with the optic axis of other arrayed optical elements and thus are suitable for parallel optical transmission and data processing.

A representative method for producing a planar lens array is disclosed in JP-A-61-201639. A glass substrate is coated with a metallic titanium film as an ion diffusion preventive mask. The titanium film is then provided with a circular aperture for diffusion of ion using an ordinary photolithographic technique. The glass substrate thus masked is then dipped in a molten salt mixed with nitrate so that alkaline metal ions in the glass substrate are exchanged with components for increasing the refractive index of glass such as thallium (Tl) ion and silver (Ag) ion in the molten salt. In this manner, a distribution of refractive indices corresponding to the distribution of concentration of hemispherically dispersed ions is formed in the glass substrate. This distribution acts as a lens.

In addition, descriptions of graded refractive index lenses can be found in JP-A-61-26535 and JP-A-61-132541. More specifically, these documents disclose in their Examples that ion exchange took place between a glass plate in which $P_2O_5$, $Na_2O$, $K_2O$ and $Al_2O_3$ are contained and a fused salt made of silver nitrate and potassium nitrate. Further, they disclose that the distribution curve patterns showing refractive index-distributions within the refractive index distribution region were upwardly convex in shape.

SUMMARY OF THE INVENTION

When Tl is used as a refractive index-increasing component, the resulting lens can be provided with a raised numerical aperture. However, since the rate of diffusion of Tl ion in the glass substrate is small, it takes much time to prepare a lens having a diameter of not smaller than 100 $\mu$m.

Moreover, the arts disclosed in the above-cited documents JP-A-61-26535 and JP-A-61-132541 relate to treatment for exchanging ions between Ag ions and Na or/and K ions in phosphate glass.

On the other hand, when Ag is used as a refractive index-increasing component, a lens having a diameter of not smaller than 100 $\mu$m can be easily prepared because the rate of diffusion of Ag ion in the glass substrate is high.

However, the phosphate glass containing about 48 weight % $P_2O_5$, about 20 weight % $Na_2O$ and about 9 weight % $K_2O$ is used as mother glass in the documents JP-A-61-26535 and JP-A-61-132541. In this glass, phosphoric acid acts as network former, and besides, alkalis are contained in high amounts. Therefore, such glass has a drawback of being poor in chemical resistance.

The invention has been made in order to solve such problems. Therefore, an aim of the invention is to provide a planar lens having a great numerical aperture acquired by diffusion of Ag as a refractive index-increasing component into a glass substrate containing Li and having excellent chemical resistance and a method of producing the aforesaid planar lens.

The invention is intended for a hemispherical planar lens in which a refractive index-increasing component is diffused in a substantially hemispherical form or a semicylindrical (lenticular) planar lens in which a refractive index-increasing component is diffused in a substantially semicylindrical form. These planar lenses are characterized by utilizing Ag as a refractive index-increasing component and further containing in a glass substrate at least Li as a component of alkali metal to undergo ion exchange for Ag.

In the case of using Ag as a refractive index-increasing component, long-range diffusion of Ag is controlled to a greater extent as a difference between the ionic radii of Ag and an element exchanged for Ag becomes bigger. As a result, the distribution curve of refractive index comes to have a convex form in the positive direction of the coordinate axis for the refractive index n.

However, the condition of Ag diffusion is also influenced by factors other than the ionic radii of ions participating in ion exchange. For instance, the state of chemical bonds in glass is one of such factors. Specifically, the stronger the interaction between Ag and elements forming a network structure of the glass, the more greatly the diffusion of Ag is retarded.

When a refractive index distribution curve of the present planar lens is rendered convex in the positive direction of the coordinate axis for the refractive index, the numerical aperture of the lens can be enlarged for the following reason.

More specifically, the refractive index at some diffusion length is greater than that in a "linear" distribution, provided that the refractive index distribution curve is convex in the positive direction of the coordinate axis for the refractive index n within the distribution region of refractive indices of a planar lens. In other words, the refraction of light at the diffusion length satisfying the above condition becomes great and the focal length of the lens can be shortened. As a result, the numerical aperture of the lens can be enlarged. Additionally, the present planar lens is large in numerical aperture and sufficiently practicable as far as the numerical apertures thereof are of the order of 0.1.

(1) A planar lens of a first embodiment of the present invention, in which a refractive index distribution is formed by diffusing a refractive index-increasing component into a flat glass substrate in a substantially hemispherical form or semicylinder form, wherein the refractive index-increasing component is silver, and the flat glass substrate comprises Li as an alkali metal that is subject to an ion exchange with the silver (2) The planar lens as described in the item (1), wherein, when taking a radial distance: r from the center of the hemisphere or the semicylinder and a refractive index: n at the radial distance r as coordinate axes orthogonal to each other, a distribution curve of the refractive index: n with respect to the radial distance: r is a convex curve in the positive direction of the coordinate axis for the refractive index: n.

(3) The planar lens as described in the item (1), wherein, when the distribution of refractive indices is expressed as a function: n(r) of a radial distance from the center of the hemisphere or the semicylinder: r and a refractive index: n, the second derivative: n"(r) of the function n(r) is negative or zero.

(4) The planar lens as described in the item (1), wherein the flat glass substrate comprises:

0 to 80 mol % $SiO_2$;
0 to 80 mol % $B_2O_3$;
0 to 80 mol % $P_2O_5$;
3 to 45 mol % $Li_2O$;
0 to 20 mol % $Na_2O$;
0 to 30 molt MgO;
0 to 30 mol % CaO;
0 to 30 mol % SrO;
0 to 30 mol % BaO;
0 to 30 mol % $ZrO_2$;
0 to 30 mol % $Y_2O_3$;
0 to 20 mol % $La_2O_3$;
0 to 40 mol % $Al_2O_3$; and
0 to 20 mol % $Sm_2O_3$,
wherein the sum of $SiO_2$, $B_2O_3$ and $P_2O_5$ is 30 to 80 mol %, and the sum of $Li_2O$ and $Na_2O$ is 3 to 65 mol %.

(5) The planar lens as described in the item (1), wherein the flat glass substrate comprises:

30 to 80 mol % $SiO_2$;
0 to 60 mol % $B_2O_3$;
3 to 45 mol % $Li_2O$;
0 to 20 mol % $Na_2O$;
0 to 30 mol % MgO;
0 to 30 mol % CaO;
0 to 30 mol % SrO;
0 to 30 mol % BaO;
0 to 30 mol % $ZrO_2$;
0 to 30 mol % $Y_2O_3$;
0 to 20 mol % $La_2O_3$;
0 to 40 mol % $Al_2O_3$; and
0 to 20 mol % $Sm_2O_3$,
wherein the sum of $SiO_2$ and $B_2O_3$ is 30 to 80 mol %, and the sum of $Li_2O$ and $Na_2O$ is 3 to 65 mol %.

(6) The planar lens as described in the item (5), wherein the flat glass substrate comprises $B_2O_3$ in an amount of 0 to 25 mol %;

(7) The planar lens as described in the item (1), wherein the flat glass substrate comprises:

30 to 80 mol % $SiO_2$;
0 to 60 mol % $B_2O_3$;
3 to 45 mol % $Li_2O$;
0 to 20 mol % $Na_2O$;
0 to 30 mol % MgO;
0 to 30 mol % CaO;
0 to 30 mol % SrO;
0 to 30 mol % BaO;
0 to 30 mol % $ZrO_2$;
0 to 30 mol % $Y_2O_3$;
0 to 20 mol % $La_2O_3$;
0 to 40 mol % $Al_2O_3$; and
0 to 20 mol % $Sm_2O_3$,
wherein the sum of $SiO_2$ and $B_2O_3$ is 30 to 80 mol %, and the sum of $Li_2O$ and $Na_2O$ is 3 to 65 mol %.

(8) A method for producing a planar lens of a second embodiment of the present invention, comprising forming a refractive index distribution by diffusing a refractive index-creasing component into a flat glass substrate in a substantially hemispherical form or semicylinder form,
wherein the refractive index-increasing component is silver, and the flat glass substrate comprises Li as an alkali metal that is subject to an ion exchange with the silver.

(9) The method for producing a planar lens as described in the item (8), wherein, when taking a radial distance: r from the center of the hemisphere or the semicylinder and a refractive index: n at the radial distance r as coordinate axes orthogonal to each other, a distribution curve of the refractive index: n with respect to the radial distance: r is a convex curve in the positive direction of the coordinate axis for the refractive index: n.

(10) The method for producing a planar lens as described in the item (8), wherein, when the distribution of refractive indices is expressed as a function: n(r) of a radial distance from the center of the hemisphere or the semicylinder: r and a refractive index: n, the second derivative: n"(r) of the function n(r) is negative or zero.

(11) The method for producing a planar lens as described in the item (8), wherein the flat glass substrate comprises:

0 to 80 mol % $SiO_2$;
0 to 80 mol % $B_2O_3$;
0 to 80 mol % $P_2O_5$;
3 to 45 mol % $Li_2O$;
0 to 20 mol % $Na_2O$;
0 to 30 molt MgO;
0 to 30 mol % CaO;
0 to 30 mol % SrO;
0 to 30 mol % BaO;
0 to 30 mol % $ZrO_2$;
0 to 30 mol % $Y_2O_3$;
0 to 20 mol % $La_2O_3$;
0 to 40 mol % $Al_2O_3$; and
0 to 20 mol % $Sm_2O_3$,
wherein the sum of $SiO_2$, $B_2O_3$ and $P_2O_5$ is 30 to 80 mol %, and the sum of $Li_2O$ and $Na_2O$ is 3 to 65 mol %.

(12) The method for producing a planar lens as described in the item (8), wherein the flat glass substrate comprises:

30 to 80 mol % $SiO_2$;
0 to 60 mol % $B_2O_3$;
3 to 45 mol % $Li_2O$;
0 to 20 mol % $Na_2O$;
0 to 30 mol % MgO;
0 to 30 mol % CaO;
0 to 30 mol % SrO;
0 to 30 mol % BaO;
0 to 30 mol % $ZrO_2$;
0 to 30 mol % $Y_2O_3$;
0 to 20 mol % $La_2O_3$;
0 to 40 mol % $Al_2O_3$; and
0 to 20 mol % $Sm_2O_3$,
wherein the sum of $SiO_2$ and $B_2O_3$ is 30 to 80 mol %, and the sum of $Li_2O$ and $Na_2O$ is 3 to 65 mol %.

(13) The method for producing a planar lens as described in item (12), wherein the flat glass substrate comprises $B_2O_3$ an amount of 0 to 25 mol %;

(14) The method for producing a planar lens as described in the item (8), wherein the flat glass substrate comprises:

30 to 80 mol % $SiO_2$;
0 to 60 mol % $B_2O_3$;
3 to 45 mol % $Li_2O$;
0 to 20 mol % $Na_2O$;
0 to 30 mol % $MgO$;
0 to 30 mol % $CaO$;
0 to 30 mol % $SrO$;
0 to 30 mol % $BaO$;
0 to 30 mol % $ZrO_2$;
0 to 30 mol % $Y_2O_3$;
0 to 20 mol % $La_2O_3$;
0 to 40 mol % $Al_2O_3$; and
0 to 20 mol % $Sm_2O_3$, wherein the sum of $SiO_2$ and $B_2O_3$ is 30 to 80 mol %, and the sum of $Li_2O$ and $Na_2O$ is 3 to 65 mol %.

In the aforementioned ranges of concentration, the concentration of $SiO_2$ and $B_2O_3$ more preferably falls within the following ranges. The use of $SiO_2$ as an essential component with the addition of a proper amount of $B_2O_3$ makes it possible to obtain an effect of enhancing the chemical resistance of the glass substrate.

$30 \leq SiO_2 \leq 80$; and
$0 \leq B_2O_3 \leq 60$

Even more preferably, the concentration of $SiO_2$ and $B_2O_3$ falls within the following ranges. In this arrangement, the chemical resistance of the glass substrate can be further enhanced.

$30 \leq SiO_2 \leq 80$; and
$0 \leq B_2O_3 \leq 25$

Alternatively, the concentration of $SiO_2$ and $B_2O_3$ may fall within the following ranges, in which $SiO_2$ is not an essential component and $B_2O_3$ is an essential component. When $B_2O_3$ is diffused as an essential component in the glass substrate in the following range of concentration, the wavefront aberration, which is one of optical properties of lens, of the resulting glass substrate can be reduced.

$0 \leq SiO_2 \leq 60$; and
$30 \leq B_2O_3 \leq 80$

When the glass substrate containing at least Li in such a way undergoes ion exchange for Ag through circular or linear apertures of a mask, planar lenses having lens diameters of, e.g., 100 μm or larger can be obtained with ease.

Further, when taking a radial distance r from the center of the hemisphere or the semicylinder and a refractive index n at the radial distance r as coordinate axes orthogonal to each other, the distribution curve of the refractive index n with respect to the distance r becomes convex in the positive direction of the coordinate axis for the refractive index n. As a result, planar lenses big in numerical aperture can be obtained.

Additionally, the inventions described in the items (4) and (11) include the cases of using phosphoric acid as a network former of glass. The present inventions contain Li as one of alkali metals to be exchanged for Ag. So the total amount of alkali metals required for producing lenses equal in performance can be reduced, and thereby the lenses obtained can be prevented from being extremely inferior in chemical resistance even when they use phosphoric acid as a network former of the glass.

By contrast, the phosphate glasses of the above-cited documents JP-A-61-26535 and JP-A-61-132541 contain Na and K as alkali metals to be exchanged for Ag. Therefore, the total amount of alkali metals required for attaining the desired lens performance is large, and thereby deterioration in chemical resistance is caused.

The preferred range of composition of the matrix glass is set forth below. The concentration of the net work former components of glass are $0 \leq SiO_2 < 80$ (hereinafter, unit is mol-%), $0 \leq B_2O_3 < 80$ and $0 \leq P_2O_5 \leq 80$, with the proviso that the sum of the concentration of these components ($SiO_2+B_2O_3+P_2O_5$) is from not smaller than 30 to not greater than 80. The concentration of the alkaline metal oxides are $3 \leq Li_2O \leq 45$ and $0 \leq Na_2O \leq 20$, with the proviso that the sum of these components is from not smaller than 3 to not greater than 65. The concentration of the network-modifier oxides and other components are $0 \leq MgO \leq 30$, $0 \leq CaO \leq 30$, $0 \leq SrO \leq 30$, $0 \leq BaO \leq 30$, $0 \leq ZrO_2 \leq 30$, $0 \leq Y_2O_3 \leq 30$, $0 \leq La_2O_3 \leq 20$, $0 \leq Al_2O_3 \leq 40$, and $0 \leq Sm_2O_3 \leq 20$.

The range of concentration of various components of these glass compositions will be further described hereinafter. ($Li_2O$)

In order to form an upwardly convex curve of distribution of refractive indices, it is essential that the alkaline ions to be exchanged with silver ion include Li ion. When the refractive index distribution curve or Ag concentration distribution curve is an upwardly convex, the numerical aperture (NA) of lens is raised. When the concentration of $Li_2O$ falls below 2%, $n_2/n_1$ ratio or $a_2/a_1$ ratio is reduced. On the contrary, when the concentration of $Li_2O$ exceeds 50%, devitrification occurs during cooling and solidification, making it impossible to form glass. Thus, it is necessary that the concentration of $Li_2O$ be from 3 to 45%, preferably from 6 to 40%, more preferably from 8 to 35%.

($Na_2O$)

The incorporation of $Na_2O$ makes it possible to accelerate the homogenization of glass and raise the numerical aperture. However, as the concentration of $Na_2O$ rises beyond 25%, $n_2/n_1$ ratio or $a_2/a_1$ ratio decreases to reduce the numerical aperture. Thus, it is necessary that the concentration of $Na_2O$ be not greater than 20%, preferably not greater than 15%, more preferably not greater than 10%.

However, when the total concentration of alkaline metal oxides to be exchanged with Ag ion falls below 3%, the resulting lens has a small numerical aperture and thus is not practical. On the contrary, when the total concentration of alkaline metal oxides to be exchanged with Ag ion exceeds 65%, the resulting glass shows a sudden deterioration of durability. Thus, it is necessary that the total concentration of alkaline metal oxides to be exchanged with Ag ion fall within the range of from 3 to 65%, preferably from 6 to 55%, more preferably from 8 to 45%.

($SiO_2$, $B_2O_3$ and $P_2O_5$)

$SiO_2$, $B_2O_3$ and $P_2O_5$ are components constituting the net work former of glass. When the sum of concentration of the three components falls below 25%, the resulting glass exhibits deteriorated durability and stability. On the contrary, when the sum of concentration of the three components exceeds 85%, the resulting glass exhibits a raised melting temperature and a required amount of other constituents cannot be secured, making it impossible to obtain a lens having a great difference of refractive index. Thus, it is necessary that the sum of concentration of the three components fall within the range of from 30 to 80%, preferably from 35 to 75%, more preferably from 40 to 70%.

($SiO_2$)

$SiO_2$ is a component constituting the skeleton of glass. When the concentration of this component exceeds 85%, the resulting glass exhibits a raised melting temperature and a required amount of other constituents cannot be secured, making it impossible to obtain a lens having a great difference of refractive index. Thus, it is necessary that the concentration of $SiO_2$ fall within the range of not greater than 80%, preferably not greater than 60%.

($B_2O_3$)

$B_2O_3$ is a component constituting the skeleton of glass. When the concentration of this component exceeds 85%, the resulting glass exhibits deteriorated durability and stability. Thus, the content of $B_2O_3$ is not greater than 80%, preferably not greater than 60%.

($P_2O_5$)

$P_2O_5$ is a component constituting the skeleton of glass. When the concentration of this component exceeds 85%, the resulting glass exhibits deteriorated durability and stability. Thus, the content of $B_2O_3$ is not greater than 80%, preferably not greater than 60%.

(MgO)

MgO is an arbitrary component which acts as a network-modifying oxide in glass to accelerate the dissolution of glass and enhance the solubility thereof. The higher MgO content is, the better is the efficiency of performance thereof. However, when the content of MgO exceeds 35%, the viscosity of the resulting molten glass is lowered more than required, causing devitrification during cooling and solidification and hence making it impossible to form glass. Thus, it is necessary that the content of MgO fall within the range of not greater than 30%, preferably not greater than 22%, more preferably not greater than 10%.

(CaO)

CaO is an arbitrary component which enhances the solubility of batch. When the content of CaO exceeds 35%, the rate at which silver ion is exchanged is lowered. Thus, it is necessary that the content of CaO fall within the range of not greater than 30%, preferably not greater than 19%, more preferably not greater than 8%.

(SrO)

SrO is an arbitrary component which enhances the solubility of batch. When the content of SrO exceeds 35%, the rate at which silver ion is exchanged is lowered. Thus, it is necessary that the content of SrO fall within the range of not greater than 30%, preferably not greater than 21%, more preferably not greater than 12%.

(BaO)

BaO exerts an extremely great effect of changing the refractive index or dispersion of glass. When the content of BaO exceeds 35%, the rate at which silver ion is exchanged is lowered. Thus, it is necessary that the content of BaO fall within the range of not greater than 30%, preferably not greater than 20%, more preferably not greater than 10%.

($ZrO_2$)

$ZrO_2$ exerts an extremely great effect of enhancing the weathering resistance of glass. When the content of $ZrO_2$ exceeds 35%, $ZrO_2$ can easily become insoluble. Thus, it is necessary that the content of $ZrO_2$ fall within the range of not greater than 30%, preferably not greater than 21%, more preferably not greater than 12%.

($Y_2O_3$)

$Y_2O_3$ exerts an extremely great effect of changing the refractive index or dispersion of glass. When the content of $Y_2O_3$ exceeds 35%, the rate at which silver ion is exchanged is lowered. Thus, it is necessary that the content of $Y_2O_3$ fall within the range of not greater than 30%, preferably not greater than 19%, more preferably not greater than 8%.

($La_2O_3$)

$La_2O_3$ exerts an extremely great effect of changing the refractive index or dispersion of glass. When the content of $La_2O_3$ exceeds 25%, the rate at which silver ion is exchanged is lowered. Thus, it is necessary that the content of $La_2O_3$ fall within the range of not greater than 20%, preferably not greater than 14%, more preferably not greater than 8%.

($Al_2O_3$)

$Al_2O_3$ exerts an extremely great effect of enhancing the weathering resistance of glass. When the content of $Al_2O_3$ exceeds 45%, $Al_2O_3$ can easily become insoluble. Thus, it is necessary that the content of $Al_2O_3$ fall within the range of not greater than 40%, preferably not greater than 32%, more preferably not greater than 25%.

($Sm_2O_3$)

$Sm_2O_3$ exerts an extremely great effect of changing the refractive index or dispersion of glass. When the content of $Sm_2O_3$ exceeds 25%, the rate at which silver ion is exchanged is lowered. Thus, it is necessary that the content of $Sm_2O_3$ fall within the range of not greater than 20%, preferably not greater than 14%, more preferably not greater than 8%.

As glass components according to the invention there may be used one or more components selected from the group consisting of ZnO, $K_2O$, $TiO_2$, $Ta_2O_5$, $Sc_2O_3$, $WO_3$, $Pr_2O_3$, $Nd_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$ in a total amount of not greater than 10% besides the aforementioned components. These components exert an effect of enlarging the vitrification range and enhancing the glass solubility. However, when these components are used in amounts greater than the above defined range, ion exchange can difficultly proceed smoothly.

Further, for the purpose of refining the glass during melting, components such as $As_2O_3$ and $Sb_2O_3$ may be diffused besides these components in a total amount of up to 2%.

BRIEF DESCRIPTION OF THE DRAWINGS

FIGS. 3(A)–3(C) is a schematic diagram showing patterns of refractive index distributions inside the substrate.

DESCRIPTION OF REFERENCE NUMERALS AND SIGNS

Figure 1:
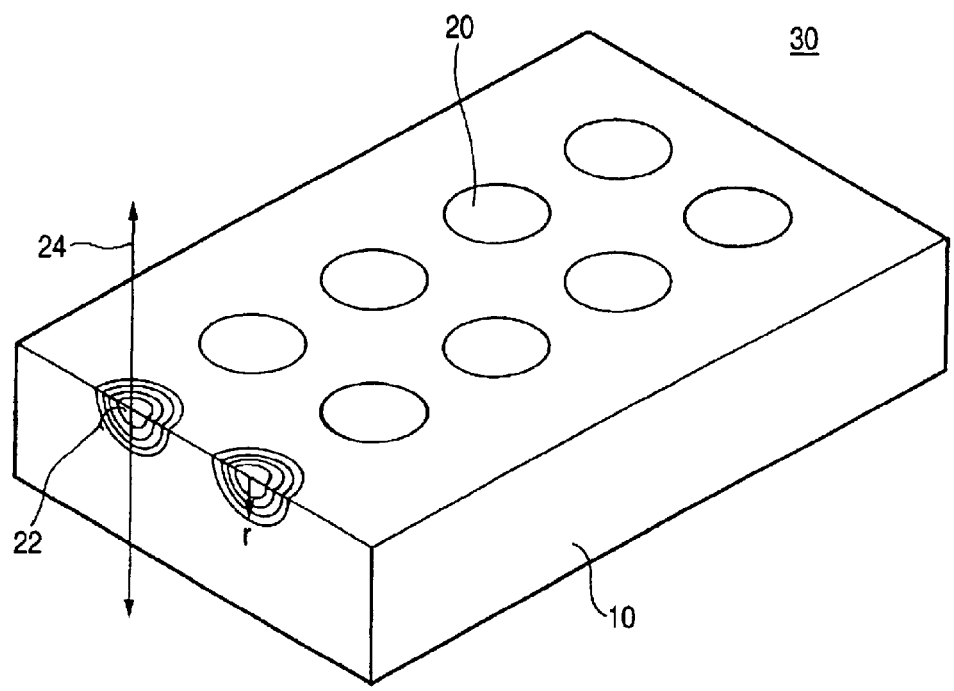
FIG. 1 is a schematic partial sectional and oblique view illustrating a hemispherical planar lens according to the invention.

10 Substrate
20 Hemispherical Lens
21 Semicylindrical Lens
22 Isorefractive curve
24 Optic axis
30 Hemispherical planar lens array
31 Semicylindrical planar lens array
4 Mask
40 Circular Aperture
41 Linear Aperture
50 Molten salt
52 Container

DETAILED DESCRIPTION OF THE INVENTION

FIG. 1 illustrates a schematic sectional oblique view of a hemispherical planar lens. FIG. 1 illustrates a lens array 30 comprising a plurality of lenses 20 formed on the surface of a flat transparent substrate 10. The lenses 20 each are formed by a substantially hemispherical portion having a higher refractive index than the substrate. In the case where this high refractive index portion is formed by ion exchanging, the refractive index in the hemisphere is not uniform. The distribution of refractive indices is such that the refractive index decreases radially from the center of the hemisphere. The group of concentric curves 22 shown in the lens schematically illustrates an isorefractive curve. The optic axis 24 of these lenses are each normally perpendicular to the surface of the substrate.

Figure 2:
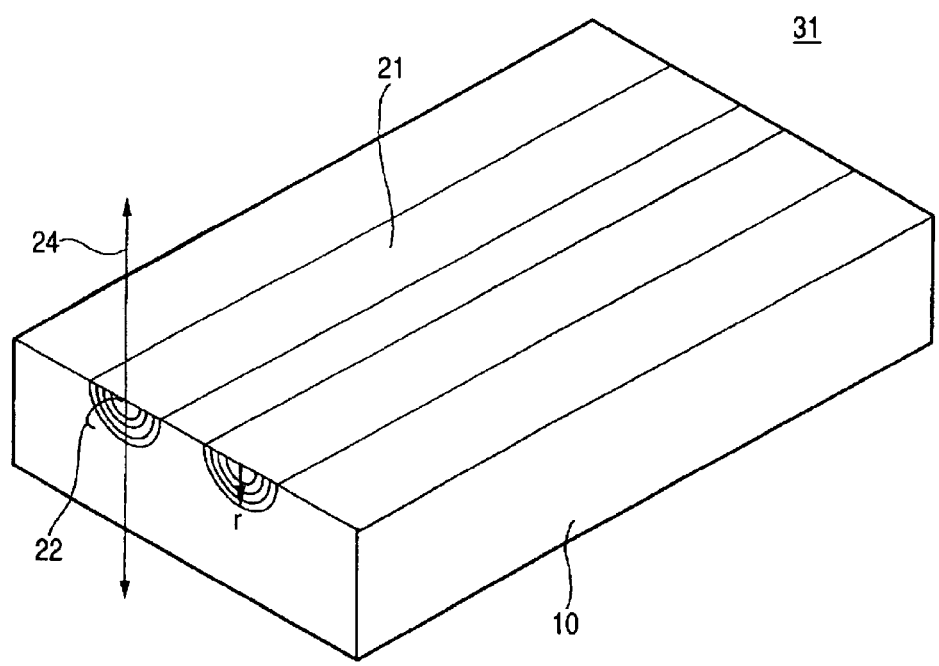
FIG. 2 is a schematic oblique view illustrating a semicylindrical planar lens according to the invention.

FIG. 2 shows a schematic oblique view of a semicylindrical (lenticular) planar lens according to the invention.

As the trends of distribution curves of refractive indices varying with radial distance rare shown in FIG. 3, the refractive indices n in the lens portion of such planar lenses can be grouped into three patterns, namely an "upwardly convex" pattern, a "linear" pattern and a "downwardly convex" pattern. Herein, the center of a hemisphere on the substrate surface is taken as r=0. The term "upwardly" as used for explanation of FIG. 3 refers to the positive direction of the coordinate axis for refractive index n, while the term "downwardly" refers to the negative direction of the coordinate axis for refractive index n. These expressions "upwardly" and "downwardly" are used in the following descriptions.

In the actual various patters of the distribution curve of refractive index, when r is in the vicinity of zero or the refractive index is close to the refractive index $n_0$ of the substrate (n to $n_0$), n may bend with respect to r. However, in the present invention, in view of the above, these patterns are classified by the entire shape of the refractive index distribution as shown in Figure. These patterns are called "convex distribution", "linear distribution" and "concave distribution", respectively.

Figure 4:
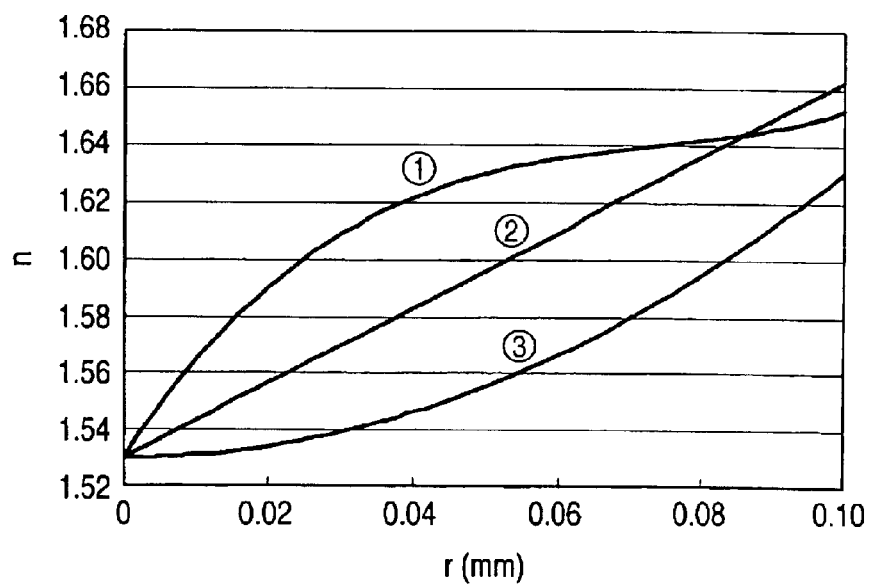
FIG. 4 shows graphs of refractive index distributions used for calculations of numerical apertures.

The relationship between these curve patterns of refractive index distribution and the numerical aperture of lens thus formed was determined by simulation calculation. Supposing a lens comprising a hemispherical high refractive index portion having a diameter of 200 µm provided on the surface of a flat substrate and having a function: n(r) of radial distribution of refractive indices of three patterns shown in FIG. 4, the numerical aperture (NA) of lens was calculated.

It was found that the lenses having a linear pattern of refractive index distribution have NA of 0.05, and a concave pattern of refractive index distribution have NA of no more than 0.05, which is a far smaller NA than the lenses having a linear pattern, and the lens having a convex pattern of refractive index distribution has NA of about 0.15, which is a far larger NA. It can thus be said that the pattern of refractive index distribution in the planar lens is preferably "convex" to increase the numerical aperture of lens.

On the other hand, the pattern of a refractive index distribution curve as one of the features of the invention may be understood to mean that, when a distribution function of refractive index is expressed as n(r), the second derivative n"(r) of the function n(r) is negative or zero.

Figure 5A:
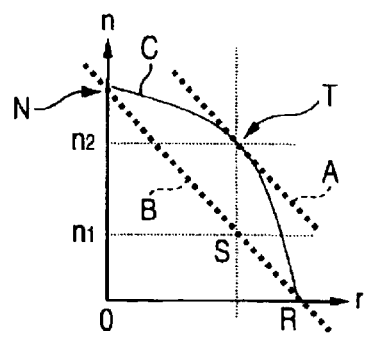
FIGS. 5(A)–5(D) is an illustration demonstrating a method of quantifying the "upwardly convex" shape of a distribution of refractive indices.
Figure 5B:
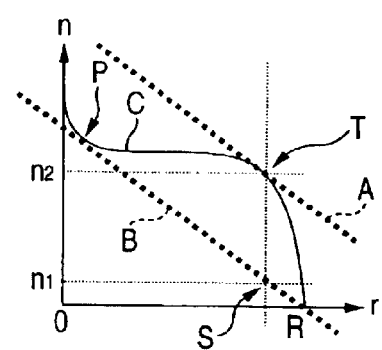
Figure 5C:
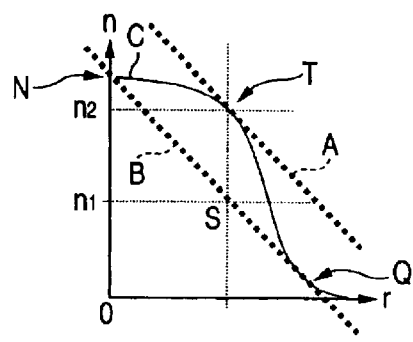
Figure 5D:
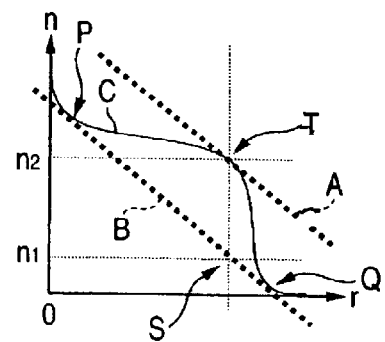
Figure 6A:
FIGS. 6(A)–6(D) is a process chart illustrating a method of producing planar lenses according to the invention.
Figure 6B:
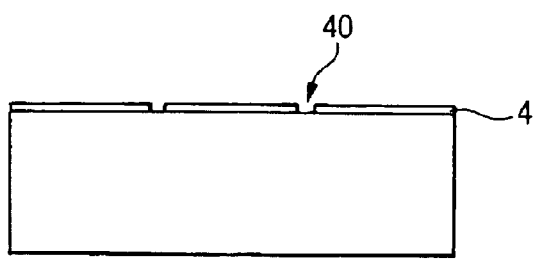
Figure 6C:
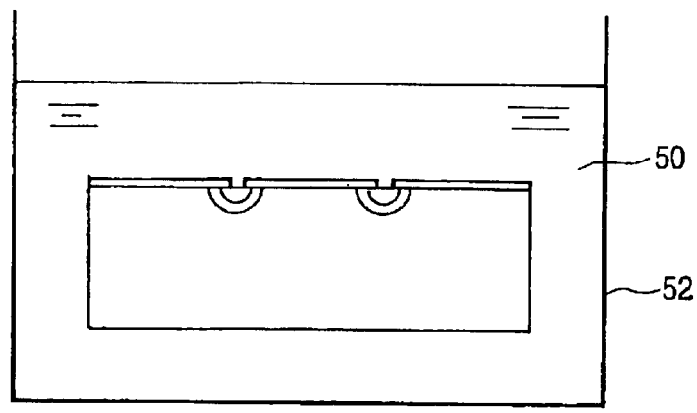
Figure 6D:
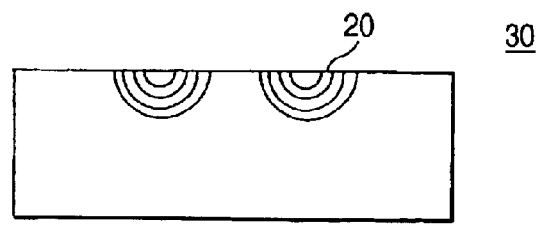

A method for quantitatively evaluating the degree of "convex" distribution of refractive indices shown in FIG. 3A will be described in connection with FIG. 5. As shown in FIG. 5A, a base line B is drawn between the intercepts N and R of n-r curve C indicating a convex distribution of refractive indices on the ordinate and the abscissa, respectively. In the case where the n-r curve C has concave bends P and Q as shown in FIG. 5D, a line is drawn tangential to the bottom of the n-r curve C to make a base line B. In the case where there are both an intercept and a bend as shown in FIGS. 5B and 5C, a line is drawn passing through the intercept and tangential to the bottom of the n-r curve C to make a base line B. Subsequently, a straight line A is drawn parallel to the base line B and tangential to the top of the n-r curve C. The refractive index at the top T in contact with the line A is defined to be $n_2$. The refractive index at the point S on the base line B having the same r value as that of the top T of the n-r curve C is defined to be $n_1$. The $n_2/n_1$ ratio of the refractive index is then used to evaluate the upwardly convex degree. Definite upwardly convex patterns of refractive index distribution have an $n_2/n_1$ ratio of greater than 1 ($n_2/n_1>1.0$).

There is a relationship between the refractive index distribution in the substrate and the distribution of concentration of refractive index-increasing component diffused. Using a composition analyzer which scans the surface of the sample with electron rays (electron probe microanalyzer (EPMA)), the distribution of concentration of Tl and Ag in the glass substrate can be examined. The relationship between the concentration a (mol-%) of refractive index-increasing component and the distance r can be represented by a-r curve as in the refractive index distribution.

As in the case of refractive index distribution, the concentration at the top of a-r curve is defined to be $a_2$. In the case where there are intercepts of a-r curve on the ordinate and abscissa or there are concave bends in a-r curve, a base line is drawn between these intercepts or bends. The concentration at the point on the base line having the same r value as the top of a-r curve is defined to be $a_1$. The $a_1/a_2$, ratio of concentration is then used to evaluate the upwardly convex degree. Definite upwardly convex patterns of refractive index distribution have an $a_2/a_1$ ratio of greater than 1.

As mentioned above, in order to enhance the numerical aperture of the lens thus formed, it is preferred that the refractive index distribution curve (n-r curve) be upwardly convex. Since there is a relationship between the shape of n-r curve and the shape of curve of distribution of concentration of refractive index-increasing component (a-r curve), the inventors made extensive studies of the relationship between the refractive index-increasing component with which a-r curve can be convex by ion exchanging and the composition of matrix glass.

As a result, it was found that when Ag ion is used as a refractive index-increasing component, it is important in the case of silicate glass comprising as a main component $SiO_2$ to incorporate $Li_2O$ in the matrix glass as an essential component.

EXAMPLES (Preparation of the Planar Lens)

The invention will be further described in the following examples, but the invention should not be limited thereto.

The composition of matrix glass prepared is set forth in. Table 1. Examples of the raw material of the various constituents used include siliceous sand powder, lithium carbonate, sodium carbonate, calcium carbonate, magnesium dioxide, barium carbonate, zirconium dioxide, strontium carbonate, yttrium oxide, lanthanum oxide, boric acid, aluminum hydroxide, samarium oxide, and phosphorus pentaoxide. A compound obtained by mixing these raw materials in predetermined amounts was put in a platinum crucible. The compound was melted at a temperature of from 1,200° C. to 1,600° C. in an electric furnace, and then stirred to obtain a homogeneous glass which was then casted over an iron plate and gradually cooled to obtain a matrix glass block of a planar lens.

FIG. 6 is a process chart illustrating a method of producing planar lenses according to the invention.

The glass block thus prepared was cut to obtain substrate having size of 30 mm square and a thickness of 3 mm and was optically polished, and a substrate 10 was obtained. The substrate thus obtained was then coated with a metallic titanium film as an ion diffusion preventive mask on the surface. This titanium film was then provided with a circular aperture 40 for ion diffusion using an ordinary photolithography. The diameter of this aperture was about 80 μm. The glass substrate thus masked was then treated in a 440° C. molten mixture of 10 mol-% of silver nitrate ($AgNO_3$) and 90 mol-% of sodium nitrate ($NaNO_3$) for 8 to 24 hours so that the alkaline metal ions in the glass substrate were exchanged with silver ions in the molten salt 50 to form a refractive index distribution. All the lenses thus obtained had a diameter of about 200 μm.

The lenses which had been thus subjected to ion exchange were each then freed of surface mask to prepare a planar lens 30.

Figure 7:
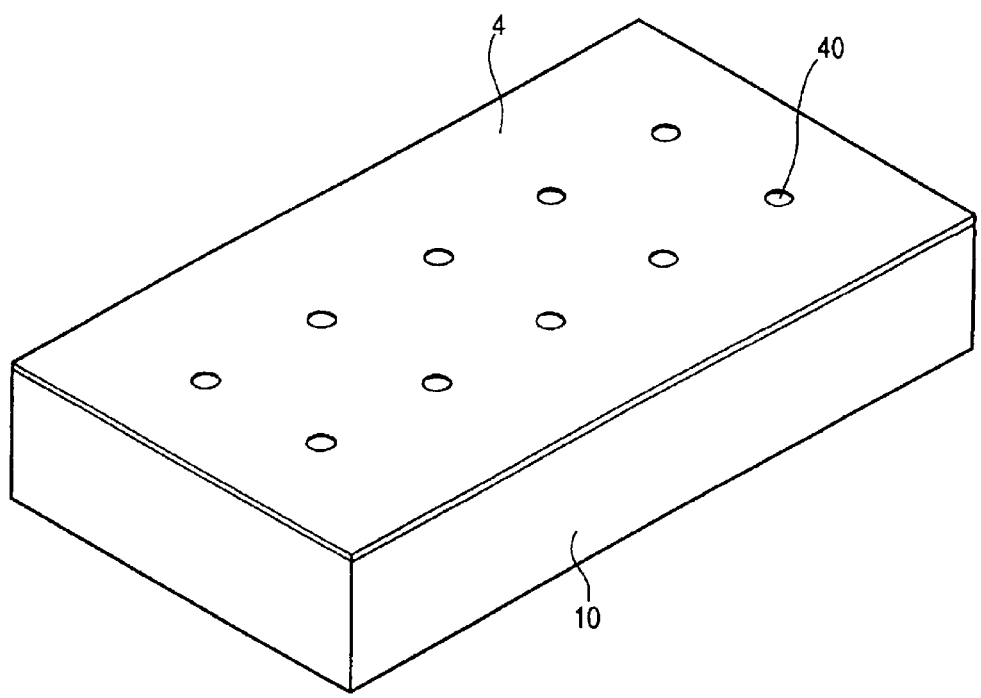
FIG. 7 shows a mask used in the case of producing hemispherical planar lenses.
Figure 8:
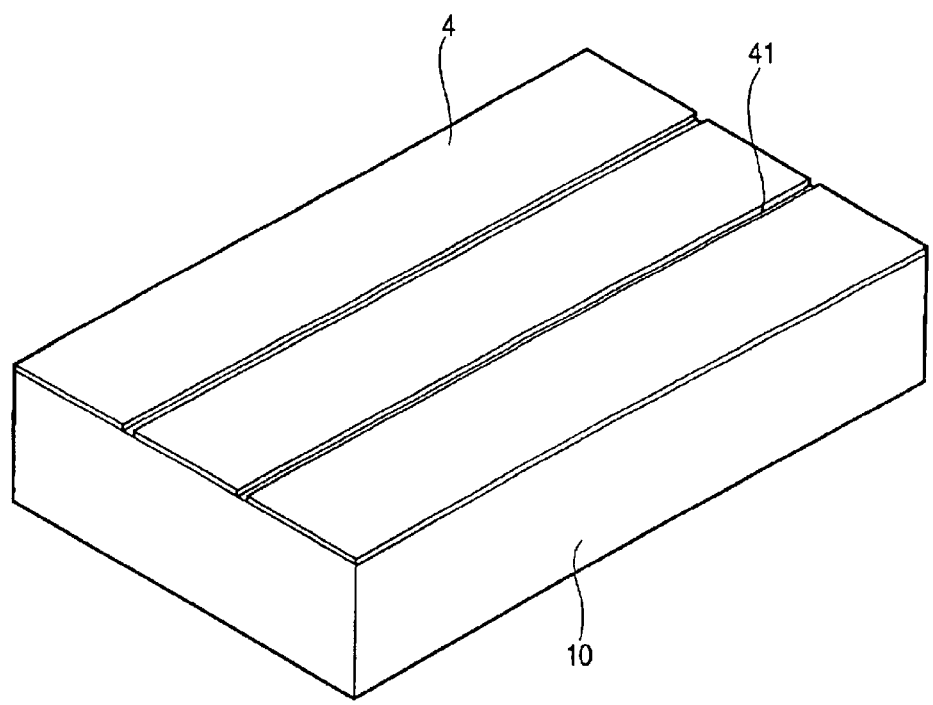
FIG. 8 shows a mask used in the case of producing semicylindrical planar lenses.

Additionally, it is advantageous to use a mask shown in FIG. 7 for production of hemispherical planar lenses. And it is appropriate to use a mask having linear apertures as shown in FIG. 8 for production of semicylindrical planar lenses.

The diameters of the thus produced planar lenses are measured, and the focal distances of light having passed through these lenses are also measured. By these measurements, the numerical apertures are determined.

All the planar lenses obtained in the following examples were found to have diameters of about 200 μm.

Example 1

Figure 9:
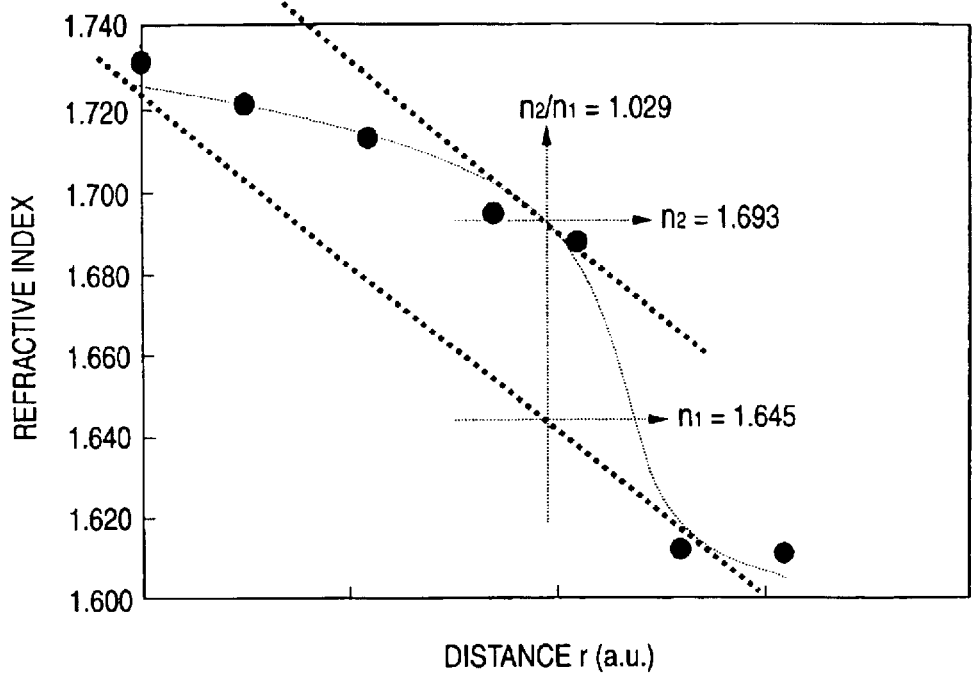
FIG. 9 is a diagram illustrating the measured value of the distribution of refractive indices in an example of the invention.

A planar lens was produced using a substrate having the mother glass composition shown on the Example 1 column of Table 1 and performing ion exchange treatment under the foregoing condition. The planar lens thus produced was examined for refractive index distribution by use of light with a wavelength of 546 nm, and the result obtained is shown in FIG. 9. As illustrated therein, the n-r curve in Example 1 has proved to be clearly "upwardly convex" in shape. Further, $n_2/n_1$ was found to be 1.029 greater than 1. Additionally, the shape of this n-r curve corresponds to FIG. 5C.

Figure 10:
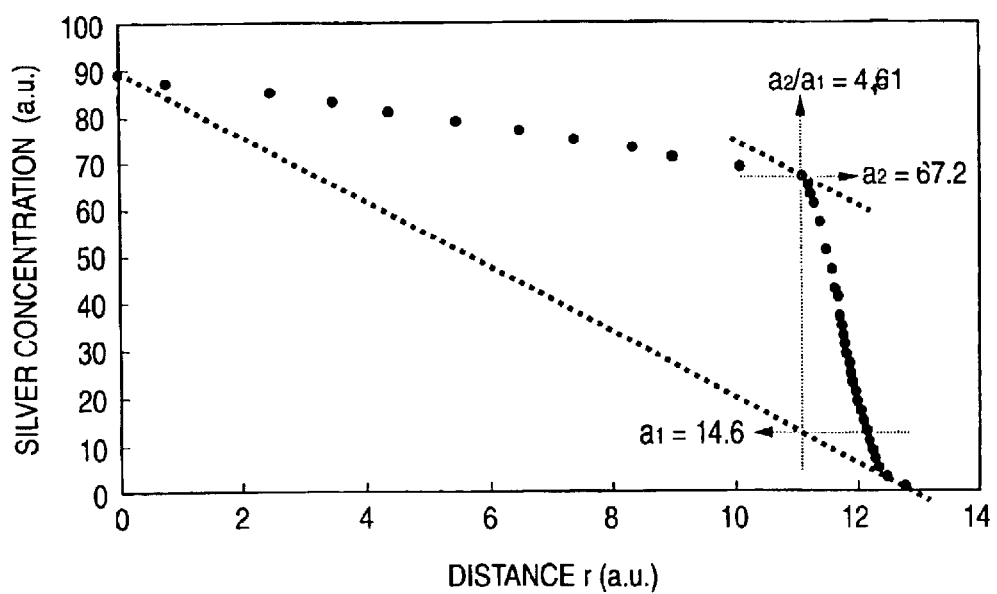
FIG. 10 is a diagram illustrating the measured value of the distribution of silver concentrations in the substrate in an example of the invention.

On the other hand, the concentration distribution of Ag was measured by EPMA. And the results thereof are shown in FIG. 10. As can be seen therefrom, the a-r curve also had a clearly "upwardly convex" shape, and $a_2/a_1$ was found to be 4.61 greater than 1.

From a comparison of the n-r curve shown in FIG. 9 and the a-r curve shown in FIG. 10, it can be seen that the refractive index distribution and the Ag concentration distribution resembled each other very strongly.

As a result of numerical aperture measurement, NA was found to be 0.15. This value was close to the calculated value obtained by the foregoing simulation, which verified the adequacy of this simulation.

Examples 2 to 13

Table 1 also shows the composition and $a_2/a_1$ ratio of Examples 2 to 13. All the samples show $a_2/a_1$ ratio of greater than 1.0, which means that the distribution curve is upwardly convex.

Figure 11:
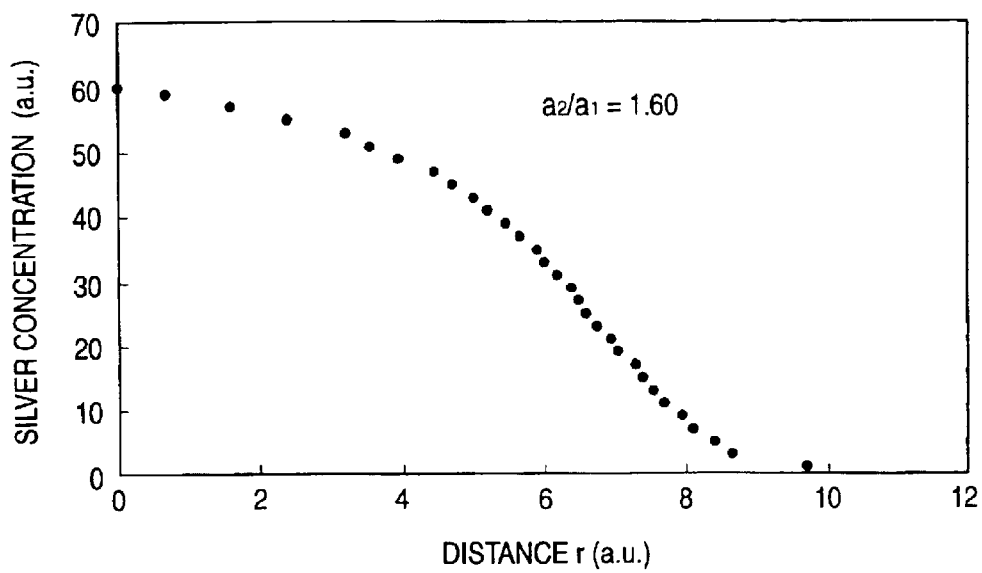
FIG. 11 is a diagram illustrating the measured value of the distribution of silver concentrations in the substrate in another example of the invention.

On the other hand, a-r curve of Example 11 has an $a_2/a_1$ ratio as small as 1.60, which means a small upwardly convex degree, as compared with Example 1 (FIG. 10) as shown in FIG. 11. In this case, the numerical aperture is 0.08, which is greater than the expected value (0.05) in the linear distribution of refractive indices but smaller than that of Examples 1 and 2.

Example 14

While all the samples of Examples 1 to 13 comprise $SiO_2$ diffused therein as a main component, the present example provides an example of glass containing $B_2O_3$ and $LiO_2$ in almost the same concentration besides $SiO_2$. In this case, $a_2/a_1$ ratio is as great as 2.5, which means that the distribution curve is convex.

Example 15

The present example is an example of glass containing $B_2O_3$ as a main component and $Na_2O$ in a greater amount than $LiO_2$ and not containing $SiO_2$. In this case, $a_2/a_1$ ratio is as not so great as about 1.7, which means that the distribution curve is upwardly convex and the wavefront error of the lens, which is one of optical properties of lens, is small.

Example 16

The present example is an example of glass containing $P_2O_5$ as a main component and not containing $SiO_2$. In this case, too, $a_2/a_1$ ratio is as not so great as about 1.6, which means that the distribution curve is convex. Glass containing $P_2O_5$ as a main component can contain $LiO_2$ and $Na_2O$ in a great amount and thus can be provided with a raised numerical aperture.

Comparative Example

Figure 12:
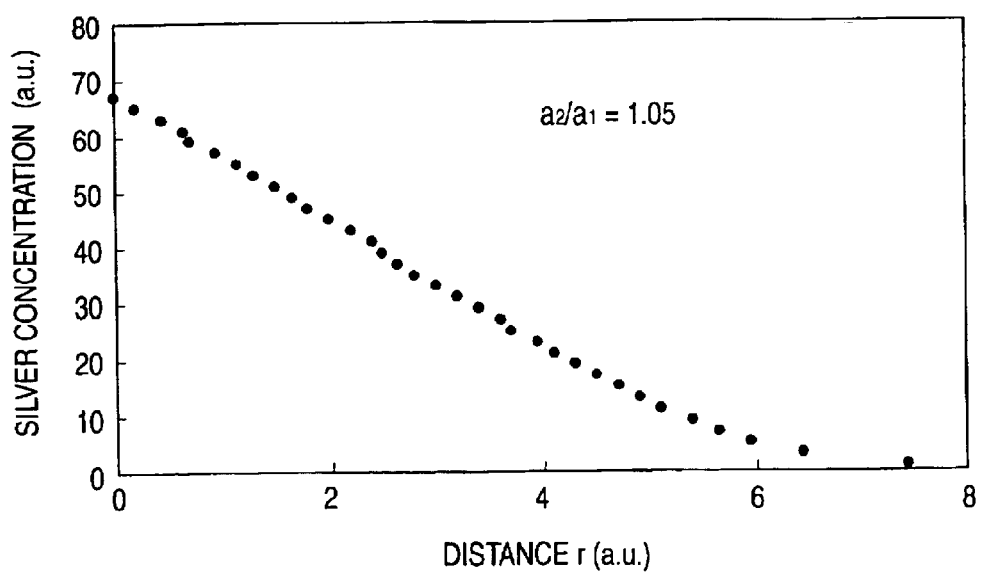
FIG. 12 is a diagram illustrating the distribution of silver concentrations in a comparative example.

For comparison, an NAB25 optical glass (produced by IOF), which is known as substrate glass for silver ion exchange, was subjected to ion exchange in the same manner as mentioned above. The shape of Ag concentration distribution curve is linear as shown in FIG. 12. The distribution curve has $a_2/a_1$ of 1.05. The numerical aperture measured was 0.05, which is very close to the calculated value obtained with the above-mentioned simulation.

It is thus made obvious that $n_2/n_1$ and $a_2/a_1$ are preferably greater than 1.01 and not smaller than 1.1, respectively.

TABLE 1

| Composition [mol %] | Example Nos. | | | | | | | |
|---|---|---|---|---|---|---|---|---|
| | 1 | 2 | 3 | 4 | 5 | 6 | 7 | 8 |
| $SiO_2$ | 50.7 | 47.9 | 60.5 | 59.2 | 54.6 | 61.7 | 62.4 | 52.1 |
| $B_2O_3$ | 7.9 | 7.5 | 7.9 | 7.7 | 7.9 | 0.0 | 7.7 | 7.7 |
| $P_2O_5$ | 0.0 | 0.0 | 0.0 | 0.0 | 0.0 | 0.0 | 0.0 | 0.0 |
| $Li_2O$ | 20.0 | 15.1 | 20.0 | 19.5 | 20.0 | 33.3 | 19.5 | 19.5 |
| $Na_2O$ | 0.0 | 9.3 | 0.0 | 0.0 | 0.0 | 0.0 | 0.0 | 0.0 |
| MgO | 9.9 | 9.3 | 0.0 | 9.7 | 9.9 | 0.0 | 0.0 | 10.3 |
| CaO | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 |
| BaO | 7.7 | 7.2 | 7.7 | 0.0 | 7.7 | 0.0 | 0.0 | 0.0 |
| $ZrO_2$ | 3.9 | 3.7 | 3.9 | 3.9 | 0.0 | 0.0 | 13.0 | 10.3 |
| $Y_2O_3$ | 0.0 | 0.0 | 0.0 | 0.0 | 0.0 | 5.0 | 0.0 | 0.0 |
| $La_2O_3$ | 0.0 | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 | 0.0 |
| $Sm_2O_3$ | 0.0 | 0.0 | 0.0 | 0.0 | 0.0 | 0.0 | 0.0 | 0.0 |
| Numerical aperture NA | 0.15 | 0.15 | — | — | — | — | — | — |
| $a_2/a_1$ | 4.61 | 2.29 | 2.89 | 2.72 | 6.40 | 2.72 | 1.39 | 1.90 |

| | Example Nos. | | | | | | | | |
|---|---|---|---|---|---|---|---|---|---|
| | 9 | 10 | 11 | 12 | 13 | 14 | 15 | 16 | Com. Ex. |
| $SiO_2$ | 57.3 | 52.1 | 55.0 | 46.7 | 58.7 | 40.0 | 0.0 | 0.0 | 37.5 |
| $B_2O_3$ | 7.7 | 7.7 | 8.1 | 0.0 | 0.0 | 30.0 | 75.0 | 5.0 | 12.5 |
| $P_2O_5$ | 0.0 | 0.0 | 0.0 | 0.0 | 0.0 | 0.0 | 0.0 | 70.0 | 0.0 |
| $Li_2O$ | 19.5 | 19.5 | 20.6 | 33.3 | 33.3 | 30.0 | 5.0 | 20.0 | 0.0 |
| $Na_2O$ | 0.0 | 0.0 | 0.0 | 0.0 | 0.0 | 0.0 | 20.0 | 0.0 | 25.0 |
| MgO | 0.0 | 0.0 | 0.0 | 0.0 | 0.0 | 0.0 | 0.0 | 0.0 | 0.0 |
| CaO | 5.2 | 0.0 | 0.0 | 0.0 | 0.0 | 0.0 | 0.0 | 0.0 | 0.0 |
| SrO | 0.0 | 10.3 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 |
| $ZrO_2$ | 10.3 | 10.3 | 10.9 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 | 0.0 | 0.0 |
| $La_2O_3$ | 0.0 | 0.0 | 5.4 | 0.0 | 0.0 | 0.0 | 0.0 | 0.0 | 0.0 |
| $Al_2O_3$ | 0.0 | 0.0 | 0.0 | 20.0 | 0.0 | 0.0 | 0.0 | 0.0 | 25.0 |
| $Sm_2O_3$ | 0.0 | 0.0 | 0.0 | 0.0 | 0.0 | 0.0 | 0.0 | 0.0 | 0.0 |
| Numerical aperture NA | — | — | 0.08 | — | — | — | — | — | 0.05 |
| $a_2/a_1$ | 1.73 | 2.24 | 1.60 | 2.19 | 3.44 | 2.50 | 1.74 | 1.62 | 1.05 |

Com. Ex.: Comparative Example

In accordance with the invention, the use of silver ion, which has a greater ion diffusion rate than thallium ion, makes it possible to reduce the ion exchanging time, and the planar lens having a diameter of 100 μm or more can be easily produced. Further, the arrangement of the silver concentration distribution in the convex form makes it possible to obtain a planar lens having a great numerical aperture.

The entire disclosure of each and every foreign patent application from which the benefit of foreign priority has been claimed in the present application is incorporated herein by reference, as if fully set forth.

What is claimed is:

1. A planar lens in which a refractive index distribution is formed by diffusing a refractive index-increasing component into a flat glass substrate in a substantially hemispherical form or semicylinder form, wherein the refractive index-increasing component is silver, and the flat glass substrate comprises Li as an alkali metal that is subject to an ion exchange with the silver, and the flat glass substrate comprises:
   0 to 80 mol % $SiO_2$;
   0 to 80 mol % $B_2O_2$;
   0 to 80 mol % $P_2O_5$;
   3 to 45 mol % $Li_2O$;
   0 to 20 mol % $Na_2O$:
   0 to 30 mol % MgO;
   0 to 30 mol % CaO;
   0 to 30 mol % SrO;
   0 to 30 mol % BaO;
   0 to 30 mol % $ZrO_2$;
   0 to 30 mol % $Y_2O_2$;
   0 to 20 mol % $La_2O_3$;
   0 to 40 mol % $Al_2O_3$; and
   0 to 20 mol % $Sm_2O_3$, wherein the sum of $SiO_2$, $B_2O_3$ and $P_2O_5$ is 30 to 80 mol %, and the sum of $Li_2O$ and $Na_2O$ is 3 to 65 mol %.

2. The planar lens as described in claim 1, wherein, when taking a radial distance: r from the center of the hemisphere or the semicylinder and a refractive index: n at the radial distance r as coordinate axes orthogonal to each other, a distribution curve of the refractive index: n with respect to the radial distance: r is a convex curve in the positive direction of the coordinate axis for the refractive index: n.

3. The planar lens as described in claim 1, wherein, when the distribution of refractive indices is expressed as a function: n(r) of a radial distance from the center of the hemisphere or the semicylinder: r and a refractive index: n, the second derivative: n"(r) of the function n(r) is negative or zero.

4. The planar lens as described in claim 1, wherein the flat glass substrate comprises:
   30 to 80 mol % $SiO_2$;
   0 to 60 mol % $B_2O_3$;

3 to 45 mol % $Li_2O$;
0 to 20 mol % $Na_2O$;
0 to 30 mol % MgO;
0 to 30 mol % CaO;
0 to 30 mol % SrO;
0 to 30 mol % BaO;
0 to 30 mol % $ZrO_2$;
0 to 30 mol % $Y_2O_3$;
0 to 20 mol % $La_2O_3$;
0 to 40 mol % $Al_2O_3$; and
0 to 20 mol % $Sm_2O_3$,
wherein the sum of $SiO_2$ and $B_2O_3$ is 30 to 80 mol %, and the sum of $Li_2O$ and $Na_2O$ is 3 to 65 mol %.

5. The planar lens as described in claim 4, wherein the flat glass substrate comprises $B_2O_3$ in an amount of 0 to 25 mol %.

6. The planar lens as described in claim 1, wherein the flat glass substrate comprises:
0 to 60 mol % $SiO_2$;
30 to 80 mol % $B_2O_3$;
3 to 45 mol % $Li_2O$;
0 to 20 mol % $Na_2O$;
0 to 30 mol % MgO;
0 to 30 mol % CaO;
0 to 30 mol % SrO;
0 to 30 mol % BaO;
0 to 30 mol % $ZrO_2$;
0 to 30 mol % $Y_2O_3$;
0 to 20 mol % $La_2O_3$;
0 to 40 mol % $Al_2O_3$; and
0 to 20 mol % $Sm_2O_3$,
wherein the sum of $SiO_2$ and $B_2O_3$ is 30 to 80 mol %, and the sum of $Li_2O$ and $Na_2O$ is 3 to 65 mol %.

7. A method for producing a planar lens, comprising forming a refractive index distribution by diffusing a refractive index-increasing component into a flat glass substrate in a substantially hemispherical form or semicylinder form,
wherein the refractive index-increasing component is silver, and the flat glass substrate comprises Li as an alkali metal that is subject to an ion exchange with the silver, and
the flat glass substrate comprises:
0 to 80 mol % $SiO_2$;
0 to 80 mol % $B_2O_3$;
0 to 80 mol % $P_2O_5$;
3 to 45 mol % $Li_2O$;
0 to 20 mol % $Na_2O$;
0 to 30 mol % MgO;
0 to 30 mol % CaO;
0 to 30 mol % SrO;
0 to 30 mol % BaO;
0 to 30 mol % $ZrO_2$;
0 to 30 mol % $Y_2O_3$;
0 to 20 mol % $La_2O_3$;
0 to 40 mol % $Al_2O_3$; and
0 to 20 mol % $Sm_2O_3$,
wherein the sum of $SiO_2$, $B_2O_3$ and $P_2O_5$ is 30 to 80 mol %, and the sum of $Li_2O$ and $Na_2O$ is 3 to 65 mol %.

8. The method for producing a planar lens as described in claim 7, wherein, when taking a radial distance: r from the center of the hemisphere or the semicylinder and a refractive index: n at the radial distance r as coordinate axes orthogonal to each other, a distribution curve of the refractive index: n with respect to the radial distance: r is a convex curve in the positive direction of the coordinate axis for the refractive index: n.

9. The method for producing a planar lens as described in claim 7, wherein, when the distribution of refractive indices is expressed as a function: n(r) of a radial distance from the center of the hemisphere or the semicylinder: r and a refractive index: n, the second derivative: n"(r) of the function n(r) is negative or zero.

10. The method for producing a planar lens as described in claim 7, wherein the flat glass substrate comprises:
30 to 80 mol % $SiO_2$;
0 to 60 mol % $B_2O_3$;
3 to 45 mol % $Li_2O$;
0 to 20 mol % $Na_2O$;
0 to 30 mol % MgO;
0 to 30 mol % CaO;
0 to 30 mol % SrO;
0 to 30 mol % BaO;
0 to 30 mol % $ZiO_2$;
0 to 30 mol % $Y_2O_3$;
0 to 20 mol % $La_2O_3$;
0 to 40 mol % $Al_2O_3$; and
0 to 20 mol % $Sm_2O_3$,
wherein the sum of $SiO_2$ and $B_2O_3$ is 30 to 80 mol %, and the sum of $Li_2O$ and $Na_2O$ is 3 to 65 mol %.

11. The method for producing a planar lens as described in claim 10, wherein the flat glass substrate comprises $B_2O_3$ in an amount of 0 to 25 mol %.

12. The method for producing a planar lens as described in claim 7, wherein the flat glass substrate comprises:
0 to 60 mol % $SiO_2$;
30 to 80 mol % $B_2O_3$;
3 to 45 mol % $Li_2O$;
0 to 20 mol % $Na_2O$;
0 to 30 mol % MgO;
0 to 30 mol % CaO;
0 to 30 mol % SrO;
0 to 30 mol % BaO;
0 to 30 mol % $ZrO_2$;
0 to 30 mol % $Y_2O_3$;
0 to 20 mol % $La_2O_3$;
0 to 40 mol % $Al_2O_3$; and
0 to 20 mol % $Sm_2O_3$,
wherein the sum of $SiO_2$ and $B_2O_3$ is 30 to 80 mol %, and the sum of $Li_2O$ and $Na_2O$ is 3 to 65 mol %.

* * * * *

UNITED STATES PATENT AND TRADEMARK OFFICE
CERTIFICATE OF CORRECTION

PATENT NO.     : 6,816,319 B2
DATED          : November 9, 2004
INVENTOR(S)    : Masahiro Tsuda, Shigekazu Yoshii, Koichi Sakagucni It is certified that error appears in the above-identified patent and that said Letters Patent is hereby corrected as shown below:

Column 3,
Line 53, should read -- 0 to 60 mol % $SiO_2$ --;
Line 54, should read -- 30 to 80 mol % $B_2O_3$ --;

Column 5,
Line 3, should read -- 0 to 60 mol % $SiO_2$ --;
Line 4, should read -- 30 to 80 mol % $B_2O_3$ --;

Signed and Sealed this

Fifth Day of April, 2005

JON W. DUDAS
*Director of the United States Patent and Trademark Office*